FIG_3

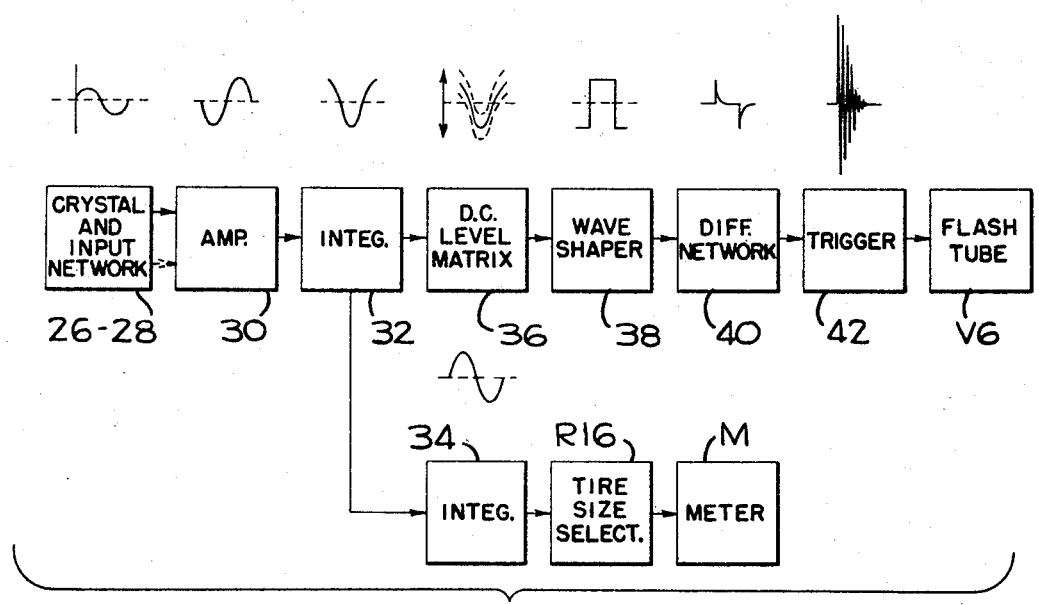
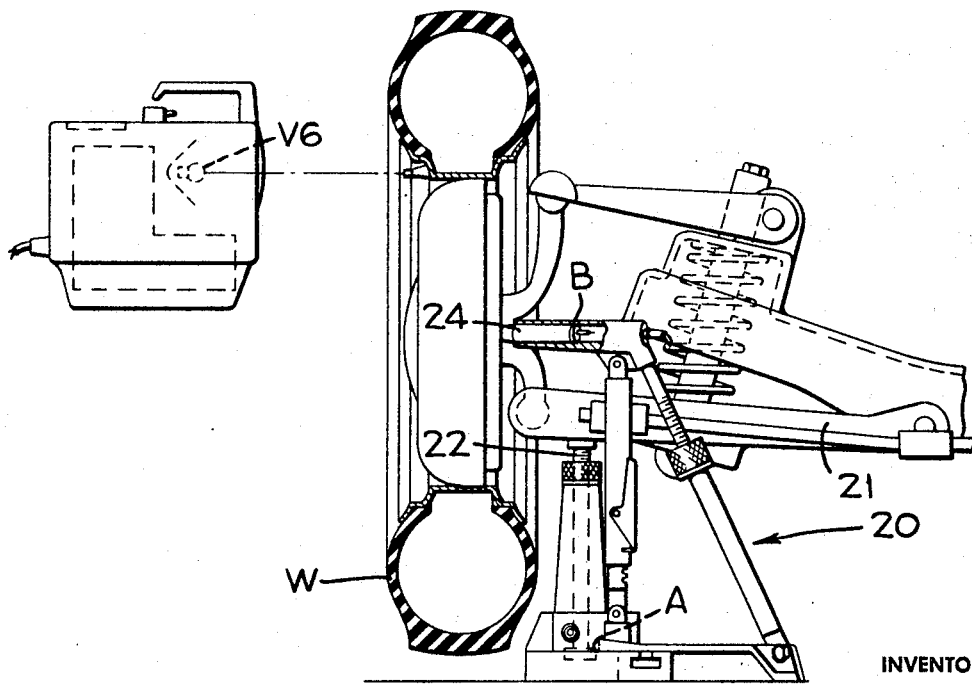
FIG_1
FIG_2
INVENTORS
WILLARD D. KAISER
HANFORD D. MONROE
BY Francis W. Anderson
ATTORNEY

United States Patent Office 3,452,603
Patented July 1, 1969

3,452,603
ELECTRONIC CIRCUIT FOR APPLICATION IN BALANCING VEHICLE WHEELS
Willard D. Kaiser, Grove City, Ohio, and Hanford D. Monroe, De Witt, Mich., assignors to FMC Corporation, San Jose, Calif., a corporation of Delaware
Filed May 3, 1966, Ser. No. 547,264
Int. Cl. G01m 1/16
U.S. Cl. 73—466                                    7 Claims

ABSTRACT OF THE DISCLOSURE

A circuit is provided for application in determing both the location of the magnitude of the unbalanced weight in a vehicle wheel. A force transducer mounted for engagement with the supporting structure for the rotating wheel sends a signal through an amplifier and a pair of cascaded, low band pass integrators to a calibrated meter reading the magnitude of the unbalanced weight with the effects of varying wheel velocities being largely removed by the process of double integration of the input signal. A pulse forming network which is operable to fire a stroboscope receives the output from the first integrator for indicating the position of the unbalanced weight.

---

The present invention pertains to an electronic circuit for application in apparatus used for the balancing of automobile wheels or the like and more particularly to an electronic circuit which utilizes a force transducer as a detecting element to generate an unbalance signal and which converts said signal into readable indicating means showing both the position of and the amount of the unbalanced weight in the wheel.

Automobile wheel balancing apparatus in commercial use today includes apparatus for detecting and indicating means for correcting unbalanced wheel weight both when the wheel is removed from the car and when it is retained upon the car. The latter type of apparatus, which necessitates means for elevating and externally applying a spinning force to the wheel, is preferable from the standpoint of effectiveness since much of the unbalance in the wheel may be affected by its mounting upon the automobile. However, the problems inherent in detecting reliable unbalance signals from a wheel which is in place on the vehicle are considerable.

Electronic on-the-car wheel balancers which are in use today generally utilize velocity type transducers to generate a signal which depends not only upon the magnitude of and the location of the unbalanced wheel weight but also to a very large extent upon the design of the automobile suspension system. Since the factors inherent in any automobile suspension system vary with the condition of the automobile, these factors can seldom be accurately predicted beforehand. Therefore, it is impossible for the operator to accurately determine the amount of and the position of the unbalanced weight from the signal received unless he has sufficient skill so that he can make rapid trial and error corrections. Since wheel balancers are typically used by service station personnel without extensive training, the trial and error method of wheel balancing can be a slow and relatively expensive proposition.

In the present invention a force transducer is used to generate a signal caused by the unbalanced weight in the rotating wheel. When the wheel is rigidly supported and a force transducer is used to generate an error signal caused by wheel unbalance, the unknown effects of the suspension system can be largely eliminated. Even when the wheel is not perfectly rigidly supported and the effects of the suspension system are introduced into the force transducer signal, any errors produced in the generated signal can be readily compensated for by the electronic circuitry.

Another problem in the design of electronic balancing apparatus is to eliminate the effect of the wheel velocity so that a generally accurate estimate of a weight needed to correct the unbalance over the range of speeds encountered under driving conditions can be obtained. It has been found that the amount of corrective weight needed to balance a wheel is always to some extent dependent upon the wheel speed due to the complex interaction of the suspension system, but the direct effect of wheel velocity upon the received signal which causes the generated unbalance forces to vary as the square of the wheel velocity can be eliminated through a process of double integration. In order to illustrate the principle of this elimination of the wheel velocity effect it will be noted that the centrifugal force developed by an unbalanced weight on a rotating object is given by the equation $$F = mr\omega^2$$

where $m$ is the mass of the unbalanced weight, $r$ is the radius, and $\omega$ is the angular velocity. When generated by a force transducer which responds to forces developed in the wheel along a single axis, the pickup voltage $V_1$ will be given by the equation $$V_1 = KF \sin \omega t = Kmr\omega^2 \sin \omega t$$

where K is a constant of the transducer. By integrating the signal $V_1$ twice with respect to time the output signal $V_2$ will be given by the equation $$V_2 = Kmr \sin \omega t$$

Thus, by electronically performing a double integration of the input signal, the output signal can be made directly proportional to the magnitude of the unbalanced weight.

It is an object of the present invention to provide an electronic circuit for application in wheel balancing apparatus which is adapted to receive an error signal due to unbalanced wheel weight from a force transducer pickup and convert said signal into information which will indicate both the position of and the amount of the unbalanced weight.

Another object of the present invention is to provide an electronic circuit utilizing cascaded integrators for removing the direct multiplying effect of the vehicle wheel velocity in converting the error signal received from a force transducer to a signal indicative of the magnitude of the weight unbalance.

Another object of the present invention is to provide an electronic circuit for generating a triggering pulse from a received sinusoidal signal voltage which pulse can be readily and accurately adjusted to coincide with the positive peak of the sinusoidal voltage so that it may be used to energize a stroboscope.

These and other objects and advantages of the present invention will become more apparent from the following description and the accompanying drawings, in which:

FIGURE 1 is a block diagram illustrating the functional components of the electronic circuit of the present invention and showing the wave shapes of the input signal at the output of the associated components.

FIGURE 2 is a diagrammatic illustration of automobile wheel balancing apparatus embodying the electronic circuit of the present invention.

FIGURE 3 is a schematic diagram of the electrical circuitry.

In utilizing wheel balancing apparatus which embodies the circuitry of the present invention, an arrangement such as shown in FIGURE 2 has been found to be practical. The construction and operation of the wheel balancing apparatus 20 shown therein is fully described in the copending application of Don A. Haynes, Ser. No. 546,704, filed may 2, 1966, which is assigned to the assignee of the present invention, and reference to said application may be made in order to ascertain further structural or operation details of the wheel balancing apparatus.

One of the features of the present invention is that it is directed to on-the-car wheel balancing systems so that those factors involved in the wheel mounting may be directly taken into account in balancing the wheel. FIGURE 2 shows a wheel balancing setup for determining the unbalance in a vehicle front wheel W. The apparatus 20 is located under the lower control arm 21 of an automobile front suspension so that the force signal generated by the unbalanced weight in the wheel W will be transmitted to a piezoelectric crystal A through a rigid probe 22 supporting the lower control arm of the vehicle. The crystal A will generate a voltage proportional to the amount of static unbalance, or the amount of unbalance in the vertical plane through the center of rotation. In order to determine the amount of unbalance in the horizontal plane through the center of rotation, or the dynamic unbalance, a rigid dynamic probe element 24 is placed in tight abutment with the edge of the brake backing plate of the wheel. Forces generated in the probe 24 as the wheel is rotated will be transmitted to a second piezoelectric force transducer crystal B to generate the unbalance signal.

An excellent choice for the force transducer crystals A and B of the present invention are lead-titanate-zirconate piezoelectric crystals since they will withstand high pressures and hard abuse. Although these crystals are linear over a rather narrow range, nonlinearity in the generated signal in the circuitry is not seriously objectionable.

As shown in FIGURE 3, the static unbalance detector crystal A and the dynamic unbalance detector crystal B are arranged to be independently switched into the electronic circuitry by switch SW–1. Each of the crystals A and B is designed with an input network 26 and 28, respectively, to supply a following amplifier circuit 30 with a voltage that is impedance matched with the input of the amplifier. The input network may be adjusted so as to attain a shift in phase of the signal voltage from the force transducer crystals if it is found necessary to compensate for a phase shift in the crystal input due to the effect of the wheel suspension system.

In the input network 26 for static unbalance, capacitors C1 and C2 are used for impedance matching with the amplifier circuit 30. Capacitor C2, resistor R1, and switch SW–2, form an attenuation network which may be used to vary the impedance match between the crystal A and the amplifier. With the switch SW–2 open, the large resistance of R1 prevents the capacitor C2 from having an appreciable effect. With the switch SW–2 closed, resistor R1 is shorted and the capacitive reactance of C2 adds to the reactance of C1 to change the impedance match. The switch SW–2 is used to adjust the circuitry for different weight unbalance ranges since the input impedance will be partially dependent upon the magnitude of the weight unbalance. The dynamic unbalance input network 28 uses a single shunting capacitor C3 to achieve impedance matching.

The preamplifier circuit 30 has for its primary purpose the amplification of the input signal to supply the subsequent components with a suitably working voltage. A variable resistor R3 in the cathode circuit of pentode V1 provides a means for altering the bias voltage of the tube. This change in bias voltage alters the gain of the circuit so that variations in the overall circuit sensitivity due to manufacturing tolerances in the components can be adjusted in order that the output will accurately reflect the magnitude of the unbalanced weight. The amplifier normally causes a 180 degree phase shift reversal between the input and output as noted by the wave shapes shown in FIGURE 1. However, a selection of the amplifier biasing resistors R4, R5 and R6, and capacitors C—4 and C—5 may be made so that the amplifier operates nonlinearly and there is a change in the phase shift at certain input frequencies. This adjustment of the amplifier circuit permits compensation for variations in the magnitude of the input signal due to any error producing effects introduced by wide variations in the angular velocity of the wheel.

The output from the amplifier 30 is coupled into the input of an integrator amplifier 32 by means of capacitor C6 and resistor R7. The integrating amplifier comprises a circuit configuration commonly known as the Miller type integrator. Triode V2 operates as a conventional amplifier with a high percentage of inverse feedback obtained through capacitor C7. Input resistor R8 acts as an isolating resistor so that the input signal from the amplifier and the feedback signal through capacitor C7 will properly mix at the control grid of the tube V2. The values of the input resistor R8, cathode biasing resistor R9, load resistor R30, and feedback capacitor C7 are chosen so that the phase shift between the input and the output of the integrator will be 270 degrees or −90 degrees as shown by the wave shapes illustrated in FIGURE 1.

The voltage gain of the integrating circuit 32 is inversely proportional to the frequency of the applied signal, i.e., the angular velocity of the unbalanced wheel. By coupling the output voltage from the integrating circuit 32 through capacitor C9 to a second integrating circuit 34, the total voltage gain of the cascaded integrating stages is therefore inversely proportional to the square of the frequency of the applied voltage. Since the unbalanced weight in a rotating body impresses a force upon the force transducer crystals A and B which is directly proportional to the square of its angular velocity, when the signal generated by the crystal is passed through the integrating circuits 32 and 34, the effect of the angular velocity of the wheel will be canceled out, and the output of the second integrating stage 34 will be proportional to the amount of unbalanced weight irrespective of the angular velocity of the wheel at the time that the input signal was obtained. It can thus be seen that the double integration obtained by circuits 32 and 34 removes the error producing effects of a variable wheel speed and permits an accurate reading proportional to the magnitude of the unbalance weight at any wheel speed within a generally defined range of normal operating speeds.

The above assumes, of course, that the angular velocity of the unbalanced weight will be within the band pass of the cascaded integrating stages 32 and 34. It should be noted that integrating circuits inherently have a very low band pass. However, this provides a general advantage in the present case since the effects of mechanical vibrations, noise, and other high frequency disturbances will be filtered out by the integrating circuitry. Even the sixty-cycle fluctuations introduced by the power supply will not introduce error into the voltage signal from the transducer crystals. When balancing automobile wheels at test speeds of from about 30 to about 100 miles per hour, the generated voltage from the crystals will vary from about 5 to 25 c.p.s. depending, of course, upon both the wheel speed and the tire diameter. With the integrating stages designed to pass frequencies only lower than 30 to 35 c.p.s., it can be seen that the spurious high frequency noise and other disturbances can be effectively eliminated and a reliable signal obtained from the output of the second integrating stage.

Integrating circuit 34 is similar to the integrator 32 in that it includes an amplifying triode V3 and a plate-to-grid feedback loop through capacitor C10. However, integrating circuit 34 differs from integrator 32 in that it includes a fixed dynamic plate circuit load through capacitor C12 and resistor R15 so as to fix the phase shift provided by this stage. Circuit stability is also enhanced by the cathode follower feedback arrangement provided by resistors R10, R11 and R13.

In order to isolate the variable reactive load of the meter M from the integrating circuits, the meter is coupled through a capacitor C11 to the cathode of the triode V3 of integrator 34. The meter M is placed in a bridge assembly comprised of diodes D1, D2, D3 and D4 which direct the signal current through a potentiometer R16 and integrating capacitor C13. The variable resistance R16 is used as a calibrating device for setting the meter to read the correct amount of unbalanced weight indicated by the error signal produced by the transducer crystal. Since the magnitude of the force generated by the unbalanced weight in the rotating wheel is directly proportional to its distance from the center of rotation, the resistor R16 is used as a means for readily adjusting the circuitry to compensate for the various wheel sizes. In addition, the resistor R16 may, of course, be used to recalibrate and compensate for readings obtained from vehicles having special suspension systems which may introduce errors into the input signal.

In order to provide a triggering pulse for a stroboscope or timing circuit to determine the position of the unbalanced weight, the output voltage from the first integrating circuit 32 is fed through a coupling capacitor C14 to a D.C. level matrix 36 which shifts the D.C. level of the signal up or down as shown by the wave shapes illustrated in FIGURE 1. Matrix 36 comprises diodes D5 and D6 connected in opposite polarity and a variable resistor R17 which controls the conduction rate of the diodes. The D.C. level of the input signal will be displaced in accordance with the magnitude and position of the differential between the two legs of the resistor R17.

The signal from the D.C. leveling network 36 is then fed to a wave shaping or cross-over detecting network 38 through a resistor R18 which applies the signal to the grid of a pentode V4. The large resistor R18 prevents the negative and positive grid currents of the tube V4 from upsetting the D.C. level established by the diodes D5 and D6. The amplifying circuit of pentode V4, including its associated component resistors R19, R20 and R21 and capacitors C15 and C16, is designed so that the sinusoidal input signal from the force transducer will be converted to a square wave signal about the sine wave cross-over point as indicated by the wave shapes illustrated in FIGURE 1.

The square wave signal developed by the wave shaping network 38 is then passed through a differentiating network 40 consisting of capacitor C17 and resistor R22 which results in an output comprised of positive and negative spikes as shown by the wave shape illustrated in FIGURE 1. Since the position of the positive spike is determined by the leading or positive moving edge of the square wave the position of which is, in turn, determined by the D.C. leveling network 36, it can be seen that the variable resistor R17 may be used to shift the position of the positive spike and therefore alter its phase relationship with the input signal. While the components of the circuit are designed so that the D.C. level adjustment will be theoretically balanced when the legs of the variable resistor R17 are equal, this condition will not always assure that the positive pulse from the differentiating network 40 will coincide with a known position of the unbalanced weight since some phase shift errors may be introduced either through the wheel suspension or due to the manufacturing tolerances of the components which would not otherwise be compensated for. By adjusting the variable resistor R17, such phase shift errors can be corrected and the positive pulse made to coincide with a known position of the unbalanced weight. Typically the positive pulse will coincide with a peak of the sinusoidal input voltage to indicate that the unbalanced weight is in line with the plane of the pickup probes.

The sharp positive and negative pulses from the differentiating network 40 are applied to the control grid of a thyratron tube V5 in a triggering circuit 42. Thyratron V5 is biased by the resistors R23 and R24 and the capacitor C18 so that only the positive pulses will cause it to conduct. Conduction of the thyratron causes the discharge of coupling capacitor C19 and a voltage drop across the load resistor R25. When the drop across the resistor R25 becomes large enough conduction through the tube V5 is stopped. The biasing network of the thyratron then prevents further conduction until another positive pulse is received. When the conduction through the tube V5 is stopped, the capacitor C19 is recharged and the triggering circuit is reactivated to await the next positive pulse from the differentiating network 40. The rapid discharge of capacitor C19 during the period of conduction causes a sharp pulse of current to flow through the primary of a stepup transformer 44. The secondary of the transformer is connected to a trigger terminal 46 of a flash tube V6 which contains an inert gas. The high voltage triggering pulse generated by the transformer ionizes the inert gas within the flash tube V6 and causes it to conduct for a short period of time to emit a bright flash of light. It can thus be seen that the flash tube V6 comprises the strobe light which serves as an indicator of the position of the unbalanced weight on the rotating wheel.

The duration of the flash from tube V6 is determined by the discharge of the storage capacitor C20 in parallel therewith. A normal negative supply voltage E− is applied across the flash tube which voltage is just below that necessary to initiate conduction through the tube by ionization of the gas. The necessary voltage for conduction is supplied by the trigger 46 which comprises a metal band wrapped around the tube. As the capacitor C20 discharges during conduction, the voltage across the tube V6 drops until it reaches a level below that necessary to sustain conduction at which time the tube will cease conducting. The period of conduction is only long enough to emit a short bright flash which the operator of the wheel balancing apparatus will utilize to fix the position of the unbalanced weight and determine the position to apply the corrective weight. It will be noted that the off-time of the tube V6 is long enough to permit capacitor C20 to fully recharge.

In the diagrammatic illustration shown in FIGURE 1, if the signal from the force transducer crystals A or B is indicative of the position of the unbalanced weight, then the flash from tube V6 will occur when the unbalanced weight is in the position of the contacting probe 22 or 24. The correcting weights will therefore be applied to the wheel 180 degrees from this indicated position.

D.C. supply voltage C+ is used for the pentode amplifier V1 and the thyratron V5 and supply voltage D+ is used for the integrator triodes V2 and V3 and the pentode V4. These supply voltages should be well regulated to prevent the introduction of errors into the meter reading.

A further feature of the electronic circuit shown is the inclusion of a tachometer circuit 48 so that the operator may readily ascertain the wheel speed at the time that he is taking readings of the magnitude of the unbalanced weight. This may be necessary since the amount of the unbalance weight may be partially dependent upon wheel speed in spite of the double integrating circuits 32 and 34 because of inherent limitations in the circuit components. The tachometer circuit utilizes the high voltage trigger pulse from the triggering network 42 and, by means of trigger 50, initiates a brief period of conduction through a small neon glow tube V7 during each revolution of the wheel. A constant D.C. potential F+ is applied to the tube V7 through a small current limiting resistor R26. Shunt capacitor C21 is designed to be fully charged to the potential of the source F+ prior to the introduction of the triggering pulse. The source voltage is arranged to be slightly less than that necessary to initiate ionization of the gas and conduction through the tube V7. Upon the application of the high voltage pulse through the trigger 50, which comprises a metal band wrapped about the tube, conduction is initiated and energy is transferred from the storage capacitor C21 to an integrating capacitor C22 feeding the meter M'. Series resistor R27 is chosen so that the voltage drop thereacross will stop conduction in the tube V7 after the capacitor C21 has been sufficiently discharged. At this time, the capacitor C21 will be recharged to await the next pulse from the trigger 50. The integrating capacitor C22 delivers a relatively constant output to the potentiometer R28 and the meter M' so that the meter reading will be proportional to the number of pulses delivered to the tube. The potentiometer R28 may then be calibrated so that the pulses received per unit of time can be related to the angular velocity of the wheel.

While the meters M and M' are shown separately, it will be appreciated that only one meter may be used with appropriate switches to alternately place it in either of the indicated positions for alternately giving unbalanced weight and wheel velocity readings.

It can thus be seen that the circuit of the present invention provides an indication both of the amount of the unbalanced weight on the rotating wheel and its position. The phase shift inherent in the circuit components is designed to provide a positive triggering pulse for a strobe light to accurately indicate the position of the unbalanced weight, and error introduced into the circuit by the circuit components can be readily adjusted out so that the phase shift from the transducer input to the flash lamp output may be maintained at 360 degrees. In addition, by means of the integrateing networks, the amount of the unbalanced weight can be determined directly irrespective of the angular velocity of the wheel, and this circuitry is provided with a means for readily adjusting for different wheel sizes. It is noted that both of these functions (unbalance position and unbalance magnitude) are combined through a first Miller type integrating circuit and that the overall circuit is therefore simplified and rendered relatively inexpensive to produce. It is also to be noted that the use of integrating networks provides a low band pass and greatly reduces the effects of the spurious high frequency signals which may be introduced.

The following table gives the values for the circuit components and an operative circuit embodying the present invention which has been successfully used in apparatus for determining the unbalance in automobile wheels.

TABLE OF CIRCUIT VALUES

Resistors:

| | |
|---|---|
| R1 | 10 meg |
| R2, R18, R21 | 1 meg |
| R3, pot. | 20K |
| R4 | 910 ohms |
| R5, R7, R10, R20 | 330K |
| R6 | 56K |
| R8 | 30K |
| R9, R13 | 1.2K |
| R11 | 10K |
| R12 | 1.5K |
| R14 | 1K |
| R15 | 5.6K |
| R16, pot. | 25K |
| R17, pot. | 350K |
| R19 | 24K |
| R22 | 1.5 meg |
| R23 | 8.2K |
| R24 | 150K |
| R25 | 27K |
| R26 | 4.7 ohms |
| R27 | 33K |
| R28, pot. | 2.5K |
| R30 | 30K |

Capacitors:

| | |
|---|---|
| C1 | .04 mf |
| C2 | 0.10 mf |
| C3 | 0.02 mf |
| C4, C8, C15 | 250 mf |
| C5, C6, C9, C14, C16 | 1.0 mf |
| C7, C10 | 0.15 mf |
| C11 | 50 mf |
| C12 | 5.0 mf |
| C13, C22 | 150 mf |
| C17 | 400 mf |
| C18 | 2.0 mf |
| C19 | 0.47 mf |
| C20 | 10 mf |
| C21 | 0.4 mf |

Tubes:
- V1, V2 — Type 6AU8A (two sections).
- V3, V4 — Type 6AU8A (two sections).
- V5 — Type 2D21 thyratron.
- V6 — Amglo, type H-88 flash tube.
- 77 — Signalite, type A-153 neon glow tube.

Voltage:

| | |
|---|---|
| C+ | 200 |
| D+ | 160 |
| E− | 400 |
| F+ | 200 |

While but one embodiment of the present invention has been shown and described, it will be understood that various changes and modifications may be made therein without departing from the spirit of the invention or the scope of the appended claims.

The invention having thus been described what is believed to be new and desired to be protected by Letters Patent is:

1. In apparatus for balancing a vehicle wheel, a circuit comprising a force transducer for generating a signal associated with the unbalanced weight in the wheel, a first integrating means having a relatively low band pass connected to the output of said transducer, a second integrating means connected to the output of said first integrating means, a meter connected to the output of said second intergrating means for reading the twice integrated signal from said second integrating means, adjustment means in said circuit for calibrating said meter to indicate the magnitude of the unbalanced weight in the wheel over a range of angular velocities, and a pulse forming network connected to receive the unfiltered and nonphase shifted output of said first integrating means for operating a stroboscope, said pulse forming network including means for readily adjusting the timing of the pulses with respect to the signal generated by said force transducer.

2. In apparatus for balancing a vehicle wheel as set forth in claim 1 wherein each integrating means functions to phase shift the signal received from said transducer by 270°, said pulse forming network including a sine wave cross-over detector normally operable to initiate a triggering pulse one-quarter of a cycle from the peak output of the sine wave received from said first integrating means.

3. In apparatus for balancing a vehicle wheel, a circuit comprising a force transducer for generating a signal associated with the unbalanced weight in the wheel, an amplifier connected to receive the output of said transducer and operable to phase shift said signal by 180°, a first integrating means having a relatively low band pass connected directly to the output of said amplifier and operable to phase shift the received signal by 270°, a second integrating means having a relatively low band pass connected directly to the output of said first integrating means and operable to phase shift the received signal by 270°, a meter connected to the output of said second integrating means for reading the twice integrated signal from said second integrating means, adjustment means in said circuit for calibrating said meter to indicate the magnitude of the unbalanced weight in a particular wheel size over a range of angular velocities, a pulse forming network connected to receive the unfiltered and nonphase shifted output of said first integrating means, said pulse forming network including a cross-over detector normally operable to initiate a pulse one-quarter of a cycle from the peak output of the sine wave received from said first integrating means, and a stroboscope operatively connected to said pulse forming network for indicating the position of the said unbalanced weight in the wheel.

4. In apparatus for balancing a vehicle wheel according to claim 3, said stroboscope being driven by high voltage triggering pulses of brief duration, a tachometer also arranged to be driven by said high voltage pulses including a normally non-conducting element arranged to be triggered into conduction by said pulses, said tachometer also including an integrating capacitor for storing the current passed through said element and a meter connected to receive the output of said capacitor to indicate the magnitude of the velocity of said vehicle wheel.

5. In apparatus for balancing a vehicle wheel, a circuit comprising a force transducer for generating a signal associated with the unbalanced weight in the wheel, means for converting said signal into a series of pulses for driving a stroboscopic circuit, means for shifting the timing of said pulses so that they will correspond in time with a known position of the unbalanced weight in the wheel, said last named means comprising a D.C. leveling network and a square wave forming network, said square wave forming network being connected to the output of said D.C. leveling network.

6. In apparatus for balancing a vehicle wheel as set forth in claim 5, said D.C. leveling network comprising a pair of diodes connected with opposite polarity through a variable resistor, variation of said resistor serving to alter the relative conduction rates of said diodes so as to shift the D.C. level of the received signal.

7. In apparatus for balancing a vehicle wheel, a circuit comprising a force transducer for generating a signal associated with the unbalanced weight in the wheel, an integrating means connected to said transducer, a D.C. leveling network connected to the output of said integrating means, a square wave forming network connected to the output of said leveling network, a differentiating network connected to the output of said square wave forming network for forming a series of sharp pulses, and a stroboscopic circuit arranged to be driven by said pulses.

References Cited

UNITED STATES PATENTS

| | | | |
|---|---|---|---|
| 2,962,899 | 12/1960 | Weisse et al. | 73—462 |
| 2,975,640 | 3/1961 | Quell | 73—466 |
| 2,979,957 | 4/1961 | Hauser et al. | 73—466 |
| 3,102,429 | 9/1963 | Hardy et al. | 73—462 |
| 3,151,485 | 10/1964 | Federn et al. | 73—462 |
| 3,205,713 | 9/1965 | Thomas et al. | 73—462 |
| 3,238,786 | 3/1966 | Pelliccotti | 73—457 |

JAMES J. GILL, *Primary Examiner.*

HERBERT GOLDSTEIN, *Assistant Examiner.*

U.S. Cl. X.R.

73—459